United States Patent Office 3,562,212
Patented Feb. 9, 1971

3,562,212
RANDOM POLY-m-CARBORANYLENESILOXANE COPOLYMERS
Santad Kongpricha, Joliet, Ill., and Hansjuergen A. Schroeder and Stelvio Papetti, Hamden, Conn., assignors to Olin Corporation, a corporation of Virginia
No Drawing. Filed June 19, 1969, Ser. No. 834,896
Int. Cl. C08f 11/04
U.S. Cl. 260—46.5                                     8 Claims

ABSTRACT OF THE DISCLOSURE

Random poly - m - carboranylenesiloxane copolymers having pendant trifluoropropyl and hydroxyl moieties are provided by reacting a 1,7-bis[alkoxyalkyl(or aryl)trifluoropropylsilyl]-m-carborane with a selected trichlorosilane and a dichlorosilane in the presence of a reaction catalyst to produce a copolymer having pendant chlorine atoms and subsequently hydrolyzing the aforementioned copolymer to yield the desired product. These random poly - m - carboranylenesiloxane copolymers containing pendant trifluoropropyl and hydroxyl moieties are mixed with fillers, antioxidants, catalysts and cross-linking agents and cured at room temperature to provide compositions useful as thermoresistant and solvent resistant seals, gaskets, etc.

---

This invention relates to random poly-m-carboranylenesiloxane copolymers having pendant trifluoropropyl and hydroxyl groups. More particularly, this invention relates to copolymers containing randomly dispersed units having the formulas

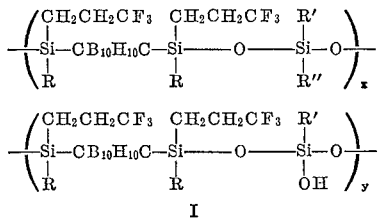

I wherein R, R' and R" are independently selected alkyl, fluoroalkyl or aryl moieties; $x$ is 1 and $y$ is between about 0.1 and about 0.2.

Various poly-m-carboranylenesiloxanes have been previously prepared and described in the literature. For example, selected copolymers containing neither trifluoropropyl nor hydroxyl groups are described in copending patent application U.S. Ser. No. 694,403, filed Dec. 29, 1967, now Pat. No. 3,463,801. While these random copolymers can be cured at high temperatures to provide useful adhesive compositions, there is still a need for elastomeric materials having thermoresistance, solvent resistance and good physical properties.

Now it has been found that random poly-m-carboranylenesiloxane copolymers having the Formula I are provided by reacting a 1,7-bis[alkoxyalkyl(or aryl)-3,3,3-trifluoropropylsilyl]-m-carborane with a selected trichlorosilane and dichlorosilane in the presence of a reaction catalyst to provide an intermediate random copolymer having a formula corresponding to I but containing pendant chlorine in lieu of hydroxyl moieties, and subsequently hydrolyzing the intermediate copolymer. The random copolymers I of this invention can be readily cured at room temperature to provide elastomeric materials having good physical and chemical properties.

More specifically, the random poly-m-carboranylenesiloxane copolymers of this invention are provided in accordance with the following general equation wherein R, R', R", $x$ and $y$ are as previously described.

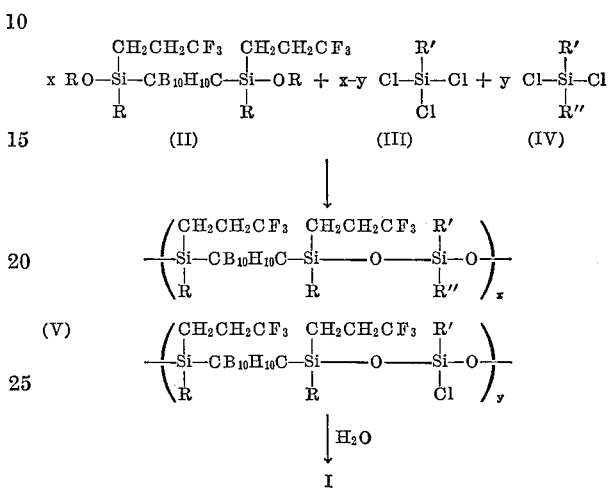

1,7 - bis[alkoxyalkyl(or aryl) - 3,3,3 - trifluoropropylsilyl]-m-carboranes having the Formula II are provided by reacting a 1,7-bis[haloalkyl(or aryl)-3,3,3-trifluoropropylsilyl]-m-carborane with an appropriate alcohol. Suitable alcohols include methanol, ethanol, n-propanol, n-butanol, etc. Generally the reaction is carried out at a temperature between about −10° C. to +175° C. and optionally an inert solvent may be employed.

The 1,7-bis[haloalkyl(or aryl) - 3,3,3 - trifluoropropylsilyl]-m-carboranes employed as starting materials in the preparation of the 1,7-bis[alkoxyalkyl(or aryl)-3,3,3-trifluoropropylsilyl]-m-carboranes II are readily provided according to the process described by S. Papetti et al. in Inorg. Chem., 3, 1448 (1964) for the preparation of 1,7-bis(chlorodimethylsilyl)-m-carborane. Thus, m-carborane is first reacted with an alkali metal alkyl or alkali metal aryl to provide dialkali metal m-carborane. The dialkali metal m-carborane is then reacted with an appropriate (3,3,3-trifluoropropyl)alkyl(or aryl)dichlorosilane to provide the desired 1,7-bis[haloalkyl(or aryl)-3,3,3-trifluoropropylsilyl]-m-carborane. A temperature between about −90° C. and 50° C. is generally employed and preferably an inert diluent such as diethylether, benzene, aliphatic hydrocarbons, etc. is utilized in the preparation of 1,7 - bis[haloalkyl(or aryl)-3,3,3-trifluoropropylsilyl]-m-carborane from m-carborane.

While any 1,7-bis[alkoxyalkyl(or aryl)-3,3,3-trifluoropropylsilyl]-m-carborane II can be employed in the preparation of the copolymers of this invention, preferred embodiments include those compounds II wherein R is an independently selected lower alkyl or polyfluoro-(lower)alkyl moiety. By the term "lower alkyl" in the claims and specification herein is meant alkyl having 1 to 4 carbon atoms.

Exemplificative preferred 1,7-bis[alkoxyalkyl(or aryl)-3,3,3-trifluoropropylsilyl]-m-carboranes II include 1,7-bis[methoxy-(3,3,3-trifluoropropyl)-methylsilyl]-m-carborane;

1,7-bis[methoxy-(3,3,3-trifluoropropyl)-n-propylsilyl]-
m-carborane;
1,7-bis[methoxy-(3,3,3-trifluoropropyl)-n-butylsilyl]-m-
carborane;
1,7-bis[methoxy-di-(3,3,3-trifluoropropyl)-silyl]-m-
carborane;
1,7-bis[methoxy-(3,3,3-trifluoropropyl)-perfluoroethyl-
silyl]-m-carborane;
1,7-bis[methoxy-(3,3,3-trifluoropropyl)-4,4,4-trifluoro-
n-butylsilyl]-m-carborane;
1,7-bis[methoxy-(3,3,3-trifluoropropyl)-2,2,2-trifluoro-
ethylsilyl]-m-carborane;
1,7-bis[methoxy-(3,3,3-trifluoropropyl)-monofluoro-
methylsilyl]-m-carborane
and the corresponding ethoxy and propoxy derivatives.

Preferred trichlorosilanes employed in the preparation of copolymers I include these compounds having the Formula III wherein R' is lower alkyl, polyfluoro (lower) alkyl or phenyl. Illustrative of these trichlorosilanes are methyltrichlorosilane, n-butyltrichlorosilane, monofluoromethyltrichlorosilane, perfluoromethyltrichlorosilane, 4-fluoro-n-butyltrichlorosilane, 2,2,2-trifluoroethyltrichlorosilane and phenyltrichlorosilane.

The preferred dichlorosilanes having the Formula IV suitable for use in the preparation of copolymers I include those compounds IV wherein R' and R" are independently selected lower alkyl, polyfluoro(lower)alkyl or phenyl. For example, dimethyldichlorosilane,
diethyldichlorosilane,
ethylmethyldichlorosilane,
di-n-butyldichlorosilane,
diphenyldichlorosilane,
(3,3,3-trifluoropropyl)-n-propyldichlorosilane,
(3,3,3-trifluoropropyl)-phenyldichlorosilane,
di-(3,3,3-trifluoropropyl)-phenyldichlorosilane,
di-(3,3,3-trifluoropropyl)-dichlorosilane,
di(monofluoromethyl)-dichlorosilane,
perfluoromethylethyldichlorosilane,
4-fluoro-n-butylmethyldichlorosilane, etc.
can be suitably employed.

Ferric chloride has been found to be a particularly effective reaction catalyst in the preparation of the copolymers of this invention. Anhydrous ferric chloride or any of the various hydrated ferric chlorides or mixture thereof can be suitably employed. Generally the catalyst is added in an amount from about 0.01 to about 5 mole percent and preferably from about 0.5 to about 3.0 percent based on the total number of moles of the reactants employed. However, greater or lesser amounts can be effectively employed.

More in detail, the preparation of the random poly-m-carboranylenesiloxane copolymers V containing pendant trifluoropropyl and chlorine moieties is carried out at a temperature between about 100° to about 250° C. and preferably from about 110° to about 190° C. Preferably, at the beginning of the reaction a temperature from about 100° to about 140° C. is maintained. After about 50 to about 70 percent of the theortical amount of gaseous alkyl byproduct has evolved, the reaction mixture commences to solidify and the reaction appears to cease. Therefore, it has been found desirable in the final stages to raise the temperature to about 175 to about 190° C. at which temperature the gas evolution resumes. If desired, additional catalyst can be added at this point. The product is then heated at this temperature range for about one hour. Elimination of the catalyst from the polymeric product can be accomplished by washing with acetone or a mixture of acetone and concentrated hydrochloric acid.

The aforementioned chlorine-containing copolymer V is then hydrolyzed by stirring at room temperature with an excess amount of water in order to provide the desired copolymer I containing pendant trifluoropropyl and hydroxyl moieties.

The random poly-m-carboranylenesiloxane copolymers I of this invention have molecular weights of about 500 up to about 5,000; however, polymeric products having molecular weights of about 1000 to about 2500 are generally preferred.

A critical feature of the random copolymers I is the mole ratio of the units in the copolymer. Thus it has been found that copolymers having mole ratios outside the critical range produce vulcanizates having undesirable physical properties.

The random poly-m-carboranylenesiloxanes I of this invention have a variety of useful applications. For example, as previously mentioned, they are readily compounded and cured at room temperature to provide elastomeric, thermally stable, fluid-resistant vulcanizates. Thus, the random copolymer I is admixed with a filler such as silica, silicate, etc., an antioxidant such as iron oxide, a catalyst such as stannous octoate, etc., and a cross-linking agent such as a tetraalkoxy silane and milled by conventional means. The compounded mixture is then either applied to any desired substrate or molded and allowed to cure at room temperature. The resulting vulcanizates are elastomeric; they can be exposed to extremely high temperatures for extended periods of time, exhibit good adhesion to substrates and excellent resistance to organic solvents such as fuels, oil and aromatic solvents.

These elastomeric vulcanizates are useful as fuel tank sealants, transmission seals, wire insulation, etc., in diverse high temperature environments. For example, hydraulic and fuel systems in supersonic aircraft depend on flexible seals which will function at or above 500° F. for extended periods of time. Furthermore, integral fuel tanks of such aircraft must be made leak-proof by use of sealants which exhibit minimal swell so as not to become displaced. The random copolymers I of this invention are suitable for these applications since they can be formulated as viscous materials that can be readily applied, and which will cure in place without exposure to heat. The resulting heat-stable vulcanizates have satisfactory bond strength to the respective metals such as aluminum or titanium and good resistance to the hot jet fuel.

Furthermore, since the random poly-m-carboranylenesiloxanes I readily form flexible and rubbery coatings on a variety of materials, they can be adapted for the preparation of seals or gaskets reinforced with strong fabrics. Their good adhesion to copper, steel and other metals makes the respective potting compounds suitable for various electrical insulations, especially wire and cable coating.

The following examples will serve to illustrate the preparation of various poly-m-carboranylenesiloxanes I in accordance with the practice of this invention.

EXAMPLE I (A) Preparation of monomers

Butyllithium (470 ml. of 2.13 N solution, 1 mole) in hexane was added dropwise, with stirring, to a solution of m-carborane (64.935 g., 0.45 mole) in 150 ml. of dry ether at −10 to −5° C. Dilithio-m-carborane precipitated and was filtered, washed twice with 200 ml. portions of hexane, and added to 120 ml. of dry ether. The dilithio-m-carborane slurry was added slowly, with vigorous stirring, to (3,3,3 - trifluoropropyl) - methyldichlorosilane (211.1 g., 1 mole) in 100 ml. of ether at 0° C. After completion of the addition, the reaction mixture was stirred at ambient temperature for two hours and filtered. Then the filtrate was evaporated to dryness and the liquid residue fractionally distilled to provide 109 g. of liquid product having a boiling point of 133–134° C./0.07 mm. Hg. The following analytical data revealed that 1,7-bis-[chloro-(3,3,3-trifluoropropyl) - methylsilyl]-m-carborane had been obtained.

*Analysis.*—Calc'd for $C_{10}H_{24}B_{10}Si_2Cl_2F_6$ (percent): C, 24.33; H, 4.90; B, 21.92; Cl, 14.37; F, 23.10. Found (percent): C, 24.46; H, 4.60; B., 21.98; Cl, 14.35; F, 22.86.

The amount of 97 g. of the 1,7-bis[chloro-(3,3,3-trifluoropropyl)-methylsilyl]-m-carborane was added dropwise, with stirring, to absolute methanol (79 g., 2.45 moles) at 0° C. The resulting solution was heated at 55–60° C. for one hour and the excess methanol and residual hydrogen chloride were removed in vacuo. The liquid residue was treated twice in the same manner with 100 ml. aliquots of methanol and distilled to provide 83.5 g. of liquid product, B.P. 135–137° C./0.08 mm. Hg, $n_D^{25}$ 1.4656. The following analytical data revealed that 1,7-bis[methoxy-(3,3,3 - trifluoropropyl)-methylsilyl]-m-carborane had been obtained.

Analysis.—Calc'd for $C_{12}H_{30}B_{10}Si_2O_2F_6$ (percent): C, 29.73; H, 6.24; B, 22.32; F, 23.52. Found (percent): C, 29.68; H, 6.17; B, 22.30; F, 22.92.

(B) Preparation of polymer

A portion (40.5 g., 0.0836 mole) of the 1,7-bis[methoxy-(3,3,3-trifluoropropyl)-methylsilyl] - m - carborane was mixed with dimethyldichlorosilane (9.71 g., 0.0752 mole), methyltrichlorosilane (1.25 g., 0.00836 mole) and anhydrous ferric chloride (0.453 g., 0.00279 mole) in a three-neck 500 ml. flask equipped with a stainless steel stirrer, reflux condenser and a nitrogen inlet line for flushing the apparatus. The reaction flask was also connected to a vacuum line having a bubble-off and an outlet for sampling volatile products. A wet test meter was connected to the bubble-off to measure methyl chloride evolution. The flask was placed in an oil bath and heated gradually to 100° C. with constant stirring. After 1 hour at 100° C., gas evolution ceased; another portion (0.325 g., 0.002 mole) of anhydrous ferric chloride catalyst was added and the reaction continued for another 30 minutes. Then, a third portion of anhydrous ferric chloride (0.493 g., 0.00303 mole) was added and the reaction mixture was heated gradually to 190° C. over a period of 60 minutes. After maintaining the reaction mixture at this temperature for about 10–15 minutes, $FeCl_3 \cdot 6H_2O$ (0.326 g., 0.0012 mole) was added. Subsequent to an induction period of 1–5 minutes, the reaction mixture began to foam. Agitation was discontinued and the temperature of the reaction mixture was maintained at 190° C. for another 60 minutes. After the reaction mixture was cooled to room temperature, it was dissolved in 250 ml. of ethyl ether and dried with 20 g. of activated charcoal to remove the ferric chloride. The reaction mixture was then hydrolyzed by vigorous agitation at room temperature with 250 ml. of 5% aqueous hydrochloric acid for about two hours. Then the reaction mixture was washed three more times with 50 ml. portions of water to remove residual ferric chloride and hydrochloric acid. After evaporation in vacuo to remove ether and other volatiles, 32 g. of a tacky solid was obtained. The molecular weight of this product, as determined by the Osmometric method in tetrahydrofuran, was found to be 3,000. The following analytical data revealed that a random poly-m-carboranylenesiloxane comprising recurring units having the following formula had been obtained.

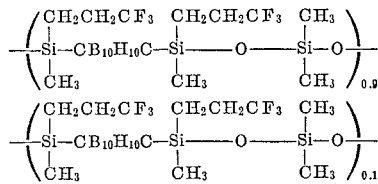

Analysis.—Calc'd for $C_{11.9}H_{29.8}B_{10}F_6O_{2.1}Si_3$ (percent): C, 28.03; H, 5.84; B, 21.03; F, 22.17; Si, 16.34. Found (percent): C, 27.72; H, 5.94; B, 21.01; F, 20.1; Si, 16.37.

(C) Preparation of cured specimen

Two representative 2 x 5 x 0.1 inch panels, A and B, were prepared by compounding the polymer described in part B supra on a rubber mill with the additives shown below in the order listed; quantities are given in parts by weight. After curing at room temperature in a steel mold for 24 hours, the specimens had the physical and chemical properties set forth in the table below.

|  | A | B |
|---|---|---|
| Formulation: |  |  |
| Polymer, parts | 100 | 100 |
| Ferric oxide, parts | 10 | 10 |
| Mined silica (5μ), parts | 80 | 80 |
| Crosslinking agent, parts | [1] 10 | [2] 10 |
| Stannous octoate, parts | 1.5 | 2 |
| Properties: |  |  |
| Shore A Hardness (ASTM D-314-58) | 52 | 55 |
| Tensile strength, p.s.i. (ASTM D-412-68) | 252 | 227 |
| Elongation, percent (ASTM D-412-68) | 140 | 123 |
| Percent swelling (after immersion for 7 days in ASTM Ref. Fuel B at room temperature) | 49 | 50 |

[1] $(CH_3O)_4Si$.
[2] $(C_2H_5O)_4Si$.

The specimens retained their flexibility after exposure at 600° F. for 24 hours.

EXAMPLE II (A) Preparation on polymer 1,7-bis[methoxy-(3,3,3-trifluoropropyl)methylsilyl]-m-carborane (34.9 g., 0.072 mole), trifluoropropylmethyldichlorosilane (13.68 g., 0.0648 mole) and methyltrichlorosilane (1.08 g., 0.0072 mole) were reacted in the same general manner as described in Example I. Two 0.234 g. (0.0072 mole) portions of anhydrous ferric chloride were added followed by two 0.234 g. (0.0072 mole) portions of $FeCl_3 \cdot 6H_2O$. An initial reaction temperature of 130° C. was employed. A tacky solid product having a molecular weight as determined by the Osmometric method in tetrahydrofuran of 2,500 was obtained. The following analytical data revealed that a random poly-m-carboranylenesiloxane comprising recurring units having the following formula had been provided.

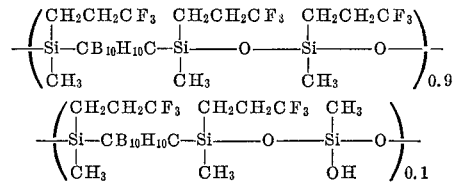

Analysis.—Calc'd for $C_{14.6}H_{30.7}B_{10}F_{8.7}O_{2.1}Si_3$ (percent): C, 28.27; H, 5.25; B, 18.18; F, 28.75; Si, 14.17. Found (percent): C, 28.50; H, 5.8; B, 18.63; F, 25; Si, 15.04.

(B) Preparation of cured specimen

Following the procedure described in Example I, a caulking formulation was prepared employing 100 parts of the polymer described in Part A supra, 50 parts silica, 10 parts ferric oxide, 7 parts tetramethoxysilane and 2 parts stannous octoate. After curing at room temperature for 24 hours in a mold, panels having a tensile strength (ASTM D-412-68) of 216-288 p.s.i., elongation (ASTM D-412-68) of 100-145% and swelling (immersion for 7 days at room temperature in ASTM Ref. Fuel B) of 23-24% was obtained. The sample retained its flexibility after exposure at 600° F. for 48 hours.

EXAMPLE III

Following the same procedure and employing the same catalysts and reaction temperatures as Example I, 1,7-bis [methoxy - (3,3,3 - trifluoropropyl) - methylsily] - m-carborane (34.9 g., 0.072 mole) was reacted with trifluoropropylphenyldichlorosilane (17.75 g., 0.648 mole) and phenyltrichlorosilane (1.52 g., 0.0072 mole) to provide a viscous liquid product having a molecular weight of about 1,000 (Osmometric method in tetrahydrofuran). The polymeric product was assigned the following formula.

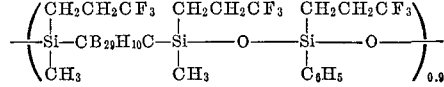

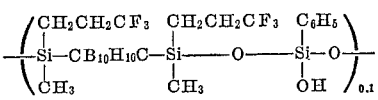

What is claimed is:
1. A random poly-m-carboranylenesiloxane copolymer comprising units having the formulas

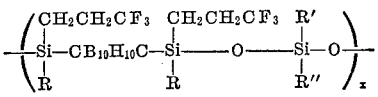

wherein R is lower alkyl or polyfluoro(lower)alkyl; R′ and R″ are independently selected lower alkyl, polyfluoro (lower) alkyl or phenyl; $x$ is 1 and $y$ is from about 0.1 to about 0.2.

2. The random poly-m-carboranylenesiloxane copolymer of claim 1 having a molecular weight between about 500 and about 5,000.

3. The random poly-m-carboranylenesiloxane of claim 2 wherein R, R′ and R″ are lower alkyl.

4. The random poly-m-carboranylenesiloxane copolymer of claim 3 wherein R, R′ and R″ are methyl.

5. The random poly-m-carboranylenesiloxane copolymer of claim 2 wherein R and R″ are lower alkyl and R′ is polyfluoro(lower) alkyl.

6. The random poly-m-carboranylenesiloxane copolymer of claim 5 wherein R and R″ are methyl and R′ is trifluoropropyl.

7. The random poly-m-carboranylenesiloxane copolymer of claim 2 wherein R is lower alkyl, R′ is an independently selected polyfluoro(lower) alkyl or phenyl and R″ is phenyl.

8. The random poly-m-carboranylenesiloxane copolymer of claim 7 wherein R is methyl, R′ is an independently selected trifluoropropyl or phenyl and R″ is phenyl.

References Cited

UNITED STATES PATENTS 3,463,801   8/1969   Papetti et al. _____ 260—448.2

HOSEA E. TAYLOR, Primary Examiner

M. I. MARQUIS, Assistant Examiner

U.S. Cl. X.R.

117—135.1; 260—18, 37, 448.2, 606.5

PO-1050
(5/69)

UNITED STATES PATENT OFFICE
CERTIFICATE OF CORRECTION

Patent No. 3,562,212            Dated February 9, 1971

Inventor(s) Santad Kongpricha, Hansjuergen A. Schroeder and Stelvio Papett

It is certified that error appears in the above-identified patent and that said Letters Patent are hereby corrected as shown below:

Col. 6, line 73, "$CB_{29}$" should read -- $CB_{10}$ --.

Col. 7, line 13, Claim 1, "$CF_2$" should read -- $CF_3$ --.

Signed and sealed this 25th day of May 1971.

(SEAL)
Attest:

EDWARD M. FLETCHER, JR.            WILLIAM E. SCHUYLER, JR.
Attesting Officer                    Commissioner of Patents